(12) United States Patent
Semba

(10) Patent No.: US 7,486,470 B1
(45) Date of Patent: Feb. 3, 2009

(54) HARD DISK DRIVE VIBRATION CANCELLATION USING ADAPTIVE FILTER

(75) Inventor: Tetsuo Semba, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/982,283

(22) Filed: Oct. 31, 2007

(51) Int. Cl.
*G11B 5/58* (2006.01)
(52) U.S. Cl. .................................... 360/77.01
(58) Field of Classification Search ............... 360/77.01, 360/75, 77.02, 77.04, 78.09, 78.05; 700/44, 700/37; 290/44; 341/143
See application file for complete search history.

(56) References Cited

U.S. PATENT DOCUMENTS

| | | | | |
|---|---|---|---|---|
| 5,673,044 A * | 9/1997 | Pellon | ........................ | 341/143 |
| 5,914,829 A | 6/1999 | Kadlec et al. | | |
| 5,920,441 A * | 7/1999 | Cunningham et al. | .... | 360/78.05 |
| 6,005,742 A * | 12/1999 | Cunningham et al. | .... | 360/78.05 |
| 6,137,187 A * | 10/2000 | Mikhail et al. | ................ | 290/44 |
| 6,347,018 B1 | 2/2002 | Kadlec et al. | | |
| 6,470,225 B1 * | 10/2002 | Yutkowitz | ..................... | 700/44 |
| 6,538,839 B1 | 3/2003 | Ryan | | |
| 6,560,059 B1 | 5/2003 | Hsin et al. | | |
| 6,563,666 B1 * | 5/2003 | LaPanse | .................. | 360/78.09 |
| 6,580,579 B1 | 6/2003 | Hsin et al. | | |
| 6,710,966 B1 | 3/2004 | Codilian et al. | | |
| 6,831,809 B2 * | 12/2004 | Kagami et al. | ........... | 360/78.09 |
| 6,961,628 B2 * | 11/2005 | Yutkowitz | ..................... | 700/37 |
| 7,206,162 B2 | 4/2007 | Semba et al. | | |
| 7,345,841 B2 * | 3/2008 | Baugh et al. | .................. | 360/75 |
| 2003/0058571 A1 | 3/2003 | Kisaka | | |
| 2004/0213100 A1 | 10/2004 | Iwashiro | | |

\* cited by examiner

*Primary Examiner*—Fred Tzeng

(57) ABSTRACT

A method of reducing the effect of vibrations associated with seek operations is disclosed. A feedforward filter is adjusted. A cancellation signal is then generated utilizing an adjusted feedforward filter, wherein the cancellation signal models a resonance of a vibration mode. The cancellation signal is provided at an actuator control signal, thereby inducing a force applied to an actuator such that the force holds the actuator at a track center position while vibrations occur during hard disk drive operations.

20 Claims, 7 Drawing Sheets

500

```
┌─────────────────────────────┐
│  Adjust a feedforward signal. │
│             505              │
└─────────────────────────────┘
              │
              ▼
┌─────────────────────────────────────┐
│ Generate a cancellation signal utilizing an │
│ adjusted feedforward filter, wherein the    │
│ adjusted feedforward filter models a        │
│ resonance of a vibration mode.              │
│                 510                         │
└─────────────────────────────────────┘
              │
              ▼
┌─────────────────────────────────────┐
│ Provide the cancellation signal at an       │
│ actuator control signal, thereby inducing   │
│ a force applied to an actuator such that    │
│ the force holds the actuator at a center    │
│ track position while vibrations occur       │
│ during hard disk drive operations.          │
│                 515                         │
└─────────────────────────────────────┘
```

FIG. 5

HARD DISK DRIVE VIBRATION CANCELLATION USING ADAPTIVE FILTER

TECHNICAL FIELD

The present invention relates to the field of hard disk drive development, and more particularly to resolving vibrations during hard disk drive operations.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

In operation, the hard disk is rotated at a set speed via a spindle motor assembly having a central drive hub. Additionally, there are tracks spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

The HDD is very sensitive to shock and vibrations, which cause errors to occur. For example, when a notebook computer is moved, the HDD existing within the notebook computer experiences a shock and/or vibration. In an effort to minimize the shock and vibrations which HDDs experience, manufacturers place shock material around the HDD. This shock material is called soft mounting.

However, the soft mounting does not protect the HDD from vibrations occurring during internal operations. When the HDD does some type of operation, the whole disk drive vibrates. For example, when the head moves in one direction during a seek operation, the whole disk drive reacts and moves in the other direction. This reactionary force causes the disk drive to vibrate, degrading the performance of the tracking accuracy. In order to reduce and/or eliminate errors, it is necessary to keep the head maintained on the same track at all times. However, if there are motions in the disk drive, such as vibrations, then the head can not accurately follow on the same track.

One way to compensate for the vibrating disk drive is to increase the performance of the servo and the actuator by increasing the servo's bandwidth. Servo bandwidth determines the hard disk's capability to reject a disturbance, such as the vibration of the disk drive itself. In order to increase the servo bandwidth, the performance of the actuator must be increased, which means increasing the resonance frequency. However, in order to increase the resonant frequency, it is necessary to make an actuator either rigid, heavy, of a very expensive material, or to control the manufacturing tolerances. In many cases, these options are not available or are too expensive.

Additional, there is a limitation on how much servo bandwidth may be increased. Currently, as track pitches become increasingly smaller, more servo bandwidth will be needed. In the near future, a technology to solve this problem which does not include increasing the servo band width is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of reducing the effect of vibrations associated with seek operations is disclosed. A feedforward filter is adjusted. A cancellation signal is then generated utilizing an adjusted feedforward filter, wherein the adjusted feedforward filter models a resonance of a vibration mode. The cancellation signal is provided at an actuator control signal, thereby inducing a force applied to an actuator such that the force holds the actuator at a track center position while vibrations occur during hard disk drive operations.

BRIEF DESCRIPTION OF THE DRAWINGS

FIG. 5 is a flowchart of an example method of reducing or canceling the effect of vibrations associated with hard disk drive operations in accordance with one embodiment of the present technology.

Figure 1A:
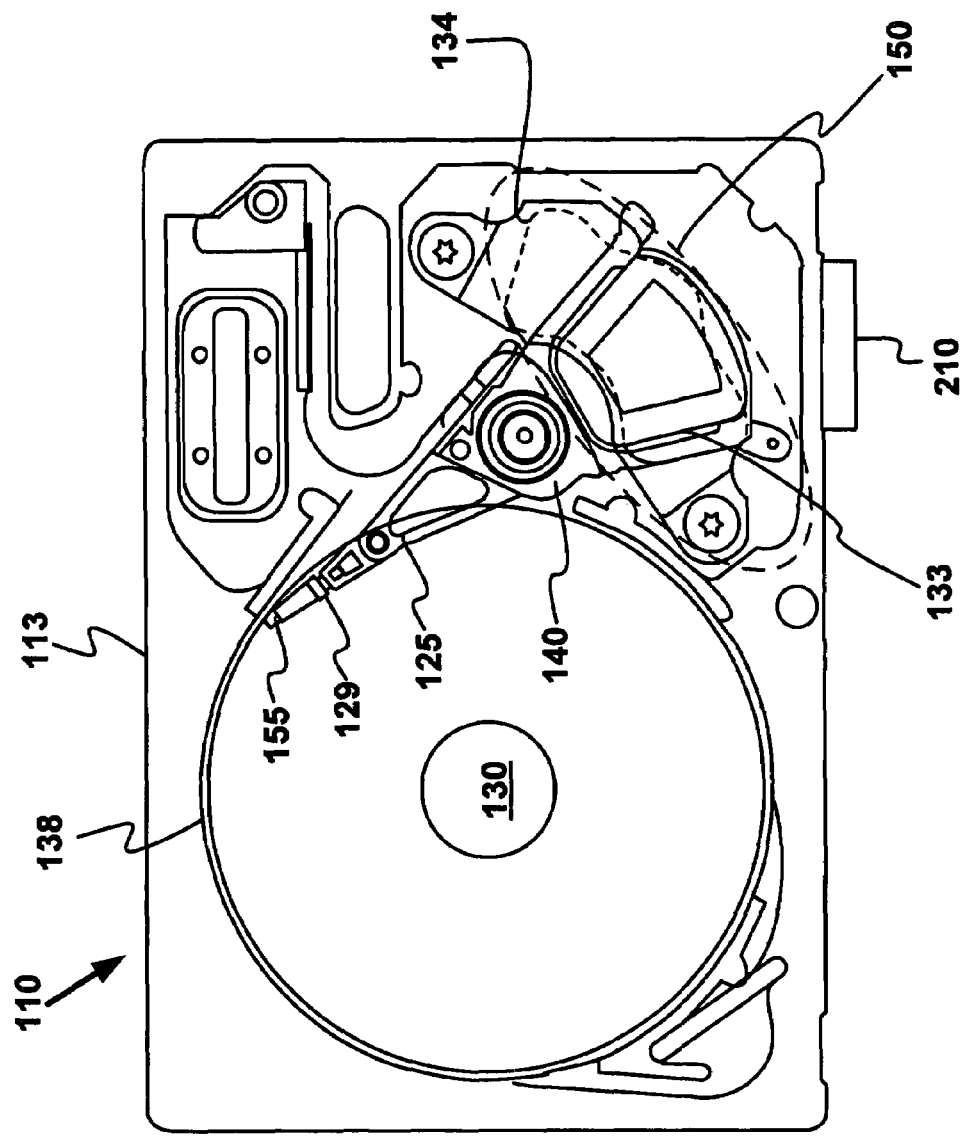
FIG. 1A is a plan view of an HDD with cover and top magnet removed in accordance with one embodiment of the present invention.

The drawings referred to in this description should be understood as not being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

OVERVIEW

As described herein, one problem with the HDD is its sensitivity to shock and vibrations occurring as a result of movement. This movement can come from external vibrations or internal vibrations. An example of an action causing external vibrations is the notebook computer, which contains an HDD, being moved to a different location. Internal vibrations can result from the operations of the HDD itself, such as when the actuator head moves from one track to another during seek operations. When an HDD experiences vibrations due to seek operations, its actuator head is not able to accurately follow on the same track, thereby producing errors during the read/write process.

However, by utilizing the feedforward filter adjustment module implementation described herein, the effect of vibrations occurring during seek operations is reduced. In other words, regardless of the amount of vibrations occurring during seek operations, a feedforward filter adjustment module implementation enables an actuator to remain positioned such that an actuator head is able to accurately follow on the same track. Instead of increasing the servo bandwidth such as is currently done, a cancellation signal is added to the servo to compensate for the motion experienced by the hard disk drive.

If the source of the vibrations and the characteristics of the soft mounting are known, a cancellation signal can be generated. The source of the vibration is the HDD motion from internal operations, and the vibration behavior is a function of the soft mounting. However, soft mounting characteristics are not the same all of the time. For example, the rigidity of the soft mounting may vary. Therefore, in order to account for this variance in soft mounting characteristics, a feed forward filter must be adjusted in order to generate a cancellation signal that will reduce and/or eliminate the effect of internal vibrations.

In general, in adjusting the feedforward filter, an updated estimated vibration mode gain and the updated estimated vibration mode frequency of the soft mounting is utilized, taking into account the position error signal of the HDD and the actuator control signals. The feedforward filter generates a cancellation signal. This cancellation signal is incorporated into the HDD servo.

Once this cancellation signal is added, even if the HDD vibrates, there is an additional force induced by a feedforward signal to hold an actuator in place. Hence, even if there are vibrations, the actuator head is able to remain on the same track, thereby reducing and/or eliminating any performance degradation in the HDD.

The following discussion will begin with an overview of a hard disk drive and components connected therewith. The discussion will then focus on embodiments of a system and method of reducing or eliminating the effect of vibrations associated with hard disk drive operations.

Operation of Example Hard Disk Drive

With reference now to FIG. 1, a schematic drawing of one embodiment of an information storage system including a magnetic hard disk file or HDD 110 for a computer system is shown. Although, only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 125. When a number of actuator arms 125 are present, they are usually represented in the form of a comb that is movably or pivotally mounted to base/housing 113. A voice coil motor (VCM) assembly 150 is also mounted to base 113 for moving the actuator arms 125 relative to the disk 138. Actuator assembly 140 may be coupled with a connector assembly 210, which is utilized to convey data between arm electronics and a host system, such as a computer, wherein HDD 110 resides.

In one embodiment, each arm 125 has extending from it at least one cantilevered suspension 129. The slider 155 is usually bonded to the end of the suspension 129. The level of integration containing the slider 155, suspension 129, and read/write head is called the head gimbal assembly (HGA).

The suspension 129 has a spring-like quality, which biases or presses the air-bearing surface of slider 155 against disk 138 to cause slider 155 to fly at a precise distance from disk 138. The suspension 129 has a hinge area that provides for the spring-like quality, and a flexing interconnect that supports read and write traces and electrical connections through the hinge area. A voice coil 133, free to move within a conventional voice coil motor magnet assembly 134 is also mounted to actuator arms 125 opposite the head gimbal assemblies. Movement of the actuator assembly 140 by voice coil motor assembly 150 causes the head gimbal assembly to move along radial arcs across tracks on the surface of disk 138.

Architecture

Figure 1B:
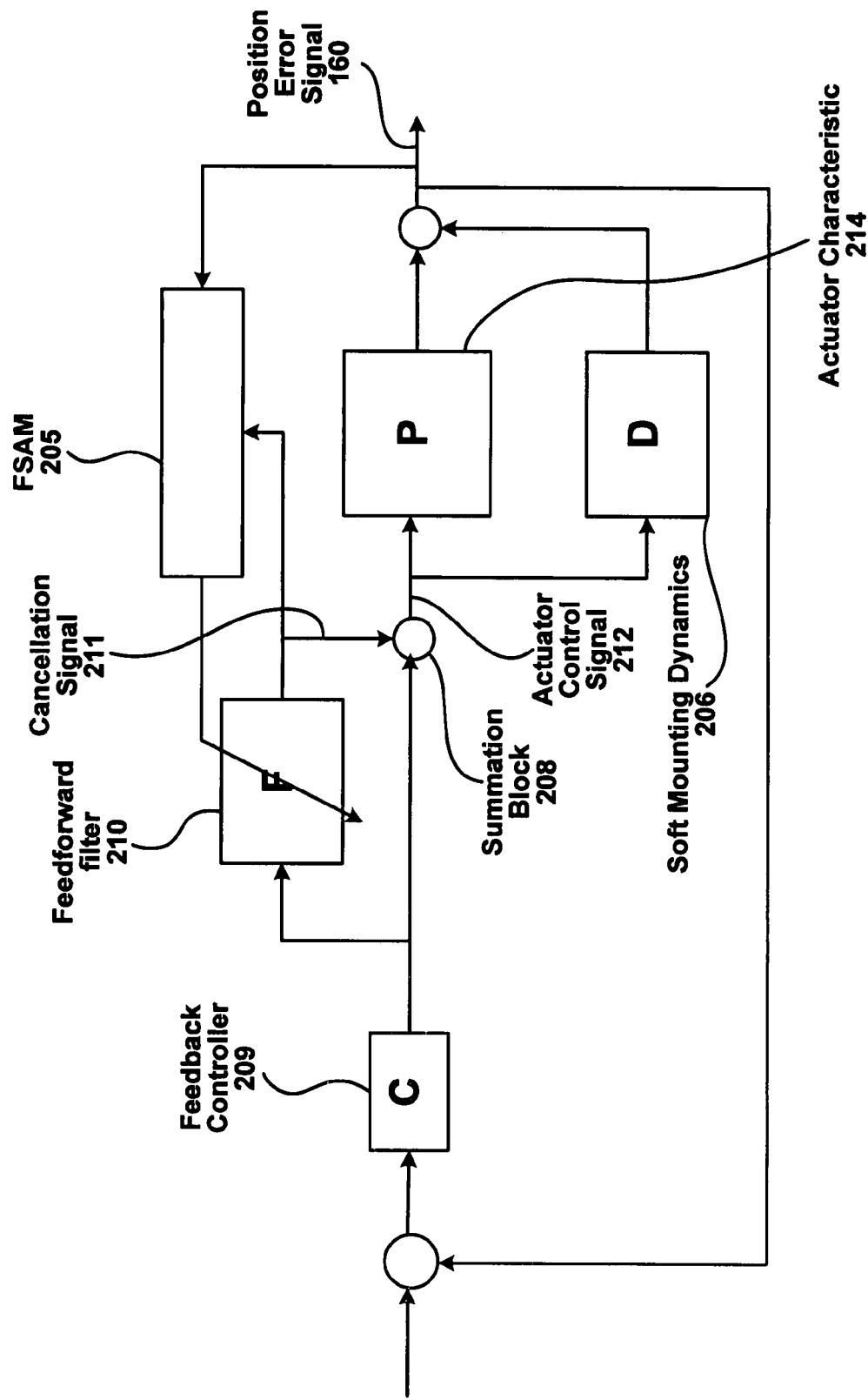
FIG. 1B is a block diagram showing the process performed to adaptively adjust a feedforward filter's frequency and gain such that the position error signal becomes small in accordance with one embodiment of the present technology.

FIG. 1B shows a block diagram of an overview of an embodiment of the present technology. The input of the feedforward filter 210 is the signal from the feedback controller 209 output. The output of the feedforward filter 210 is added to the feedback controller 209 output by summation block 208. When there is a soft mounting, the actuator characteristic 214 is modified by the soft mounting dynamics 206. The feedforward filter output compensates for the actuator motion induced by soft mounting dynamics 206 and pulls the head position back to the center of the track. The gain and the frequency of the feedforward filter 210 are adjusted by a feedforward filter adjustment module (FFAM) 205. FFAM 205 comprises a gain identifier and a frequency identifier as shown in FIG. 2B and described in later sections. FFAM 205 calculates the gain and the frequency in accordance with a position error signal (PES) 160 and the feedforward filter 210 output.

Figure 2A:
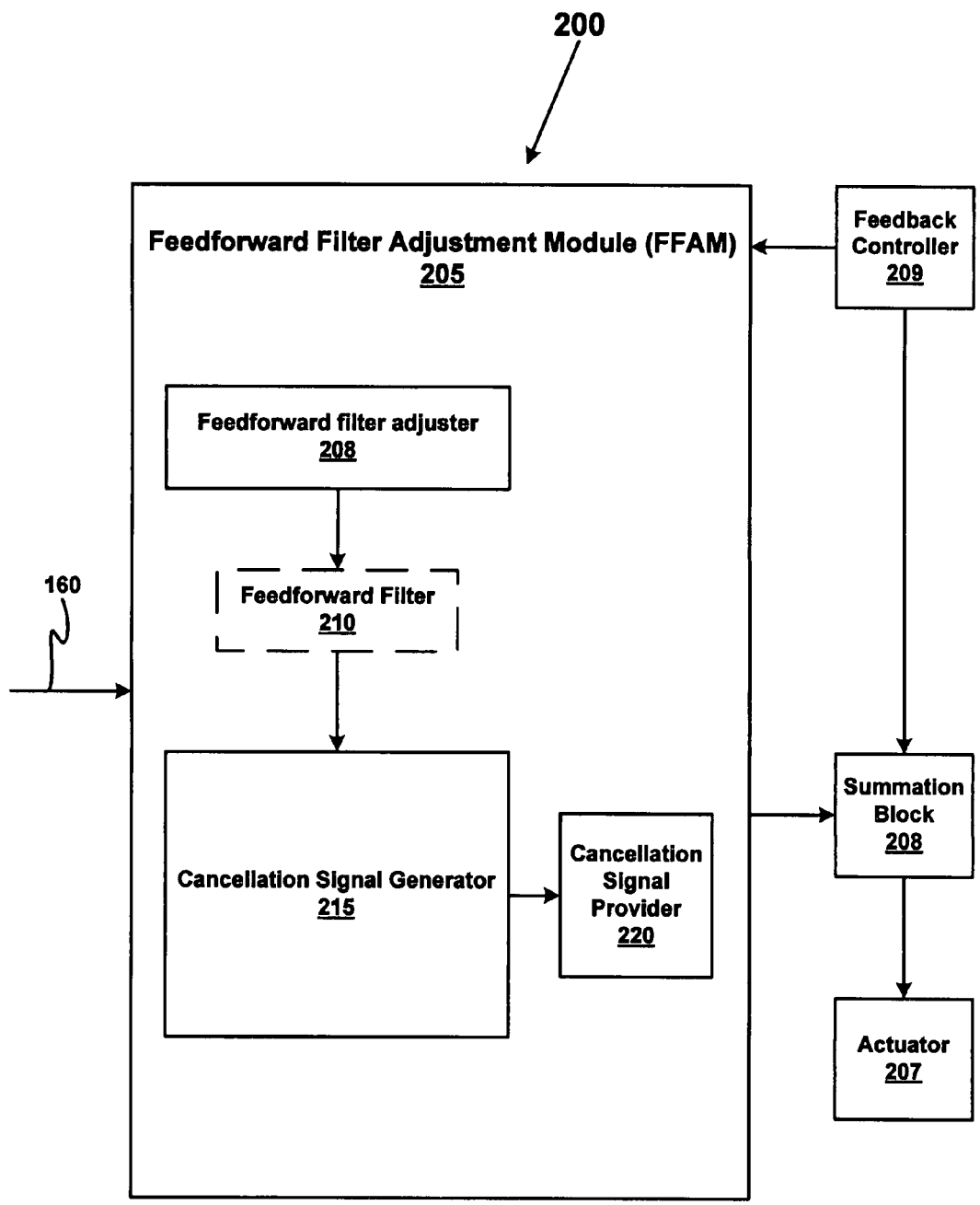
FIG. 2A is a block diagram of an example feedforward filter adjustment module in accordance with one embodiment of the present technology.
Figure 2B:
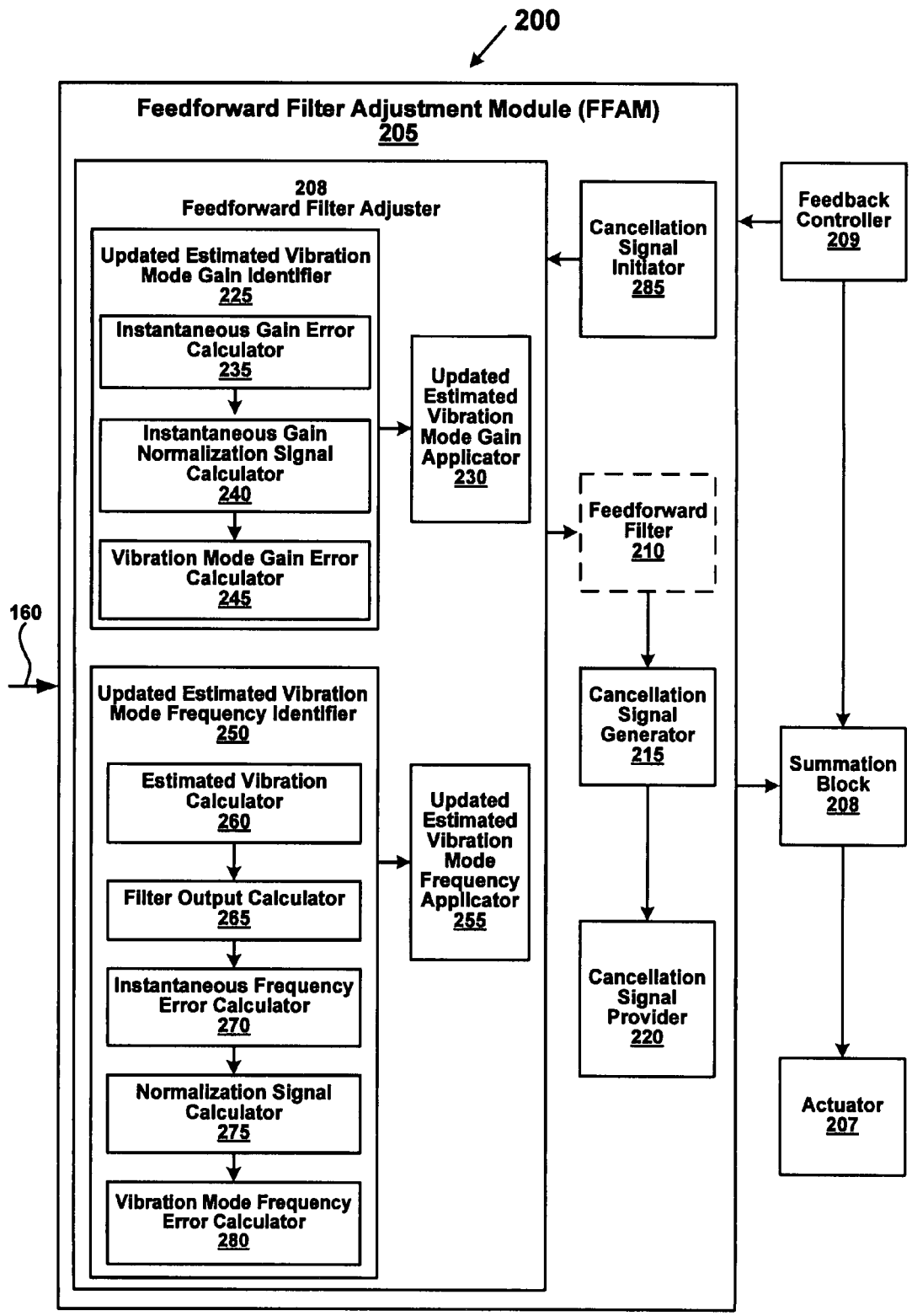
FIG. 2B is a block diagram of an example feedforward filter adjustment module in accordance with one embodiment of the present technology.

With reference now to 1B and to 200 of FIG. 2A, a block diagram of an example feedforward filter adjustment module (FFAM) 205 in accordance with one embodiment of the present technology is shown. In accordance with PES 160, FFAM 205 is configured for adjusting feedforward filter 210 to provide cancellation signal 211 at actuator control signal 212. The feedforward filter output compensates for the motion of actuator 207 induced by soft mounting dynamics 206 explained herein and pulls the head position actuator 207 back to the center of the track. The cancellation signal induces a force which is applied to actuator 207 such that the force pulls the head of actuator 207 back to the center of the track, holding actuator 207 at a position indicated by a feedforward signal, thereby reducing an effect of vibrations occurring during HDD operations.

Referring to FIG. 1, one example of an HDD 110 operation is the seek operation performed by the actuator assembly 140. The actuator arm 125 is an element of actuator assembly 140. While actuator arm 125 is held at a steady position, the head gimbal assembly is maintained on the same track. Holding actuator arm 125 at a position refers also to pulling an actuator head position back to the center of an intended track. 'Reducing' an effect of vibrations occurring during HDD 110 operations refers to a decrease or elimination of an effect of vibrations occurring during HDD 110 operations.

Referring now to FIGS. 1A and 1B, and to 2A, a block diagram of an example feedforward filter adjustment module, in one embodiment, FFAM 205 comprises feedforward filter adjuster 208, cancellation signal generator 215, and cancellation signal provider 220. Feedforward filter 210 is communicatively coupled with FFAM 205. Feedforward filter 210 may be internal of or external to FFAM 205. Feedforward filter adjuster 208 is configured to adjust feedforward filter 210. Cancellation signal generator 215 is configured for generating cancellation signal 211 from an adjusted feedforward filter 210. Cancellation signal provider 220 is configured for providing cancellation signal 211 at actuator control signal 212.

In one embodiment, feedforward filter adjuster 208 comprises updated estimated vibration mode gain identifier 225 and updated estimated vibration mode gain applicator 230. Updated estimated vibration mode gain identifier 225 is configured for identifying an updated estimated vibration mode gain. Updated estimated vibration mode gain applicator 230 is configured for applying the updated estimated vibration mode gain to a feedforward filter 210, wherein the feedforward filter 210 is located before actuator control signal 212.

In another embodiment, feedforward filter adjuster 208 comprises updated estimated vibration mode frequency identifier 250 and updated estimated vibration mode frequency applicator 255, as well as updated estimated vibration mode gain identifier 225 and updated estimated vibration mode gain applicator 230. Updated estimated vibration mode frequency identifier 250 is configured for identifying an updated estimated vibration mode frequency. Updated estimated vibration mode frequency applicator 255 is configured for applying updated estimated vibration mode frequency to feedforward filter 210, wherein feedforward filter 210 is located before actuator control signal 212.

Operation

Referring to FIG. 5, a flowchart of an example method of reducing or canceling the effect of vibrations associated with HDD 110 operations in accordance with one embodiment of the present technology is shown. In operation and referring to 505 of FIG. 5, the present technology adjusts feedforward filter 210. In reference to 510 of FIG. 5, cancellation signal 211 is generated utilizing an adjusted feedforward filter 210, wherein an adjusted feedforward filter 210 models a resonance of a vibration mode. In reference to 515 of FIG. 5, cancellation signal 211 is provided at actuator control signal 212, thereby inducing a force applied to actuator 207 at a track center position while vibrations occur during HDD 110 operations.

Adjusting a Feedforward Signal

Figure 3:
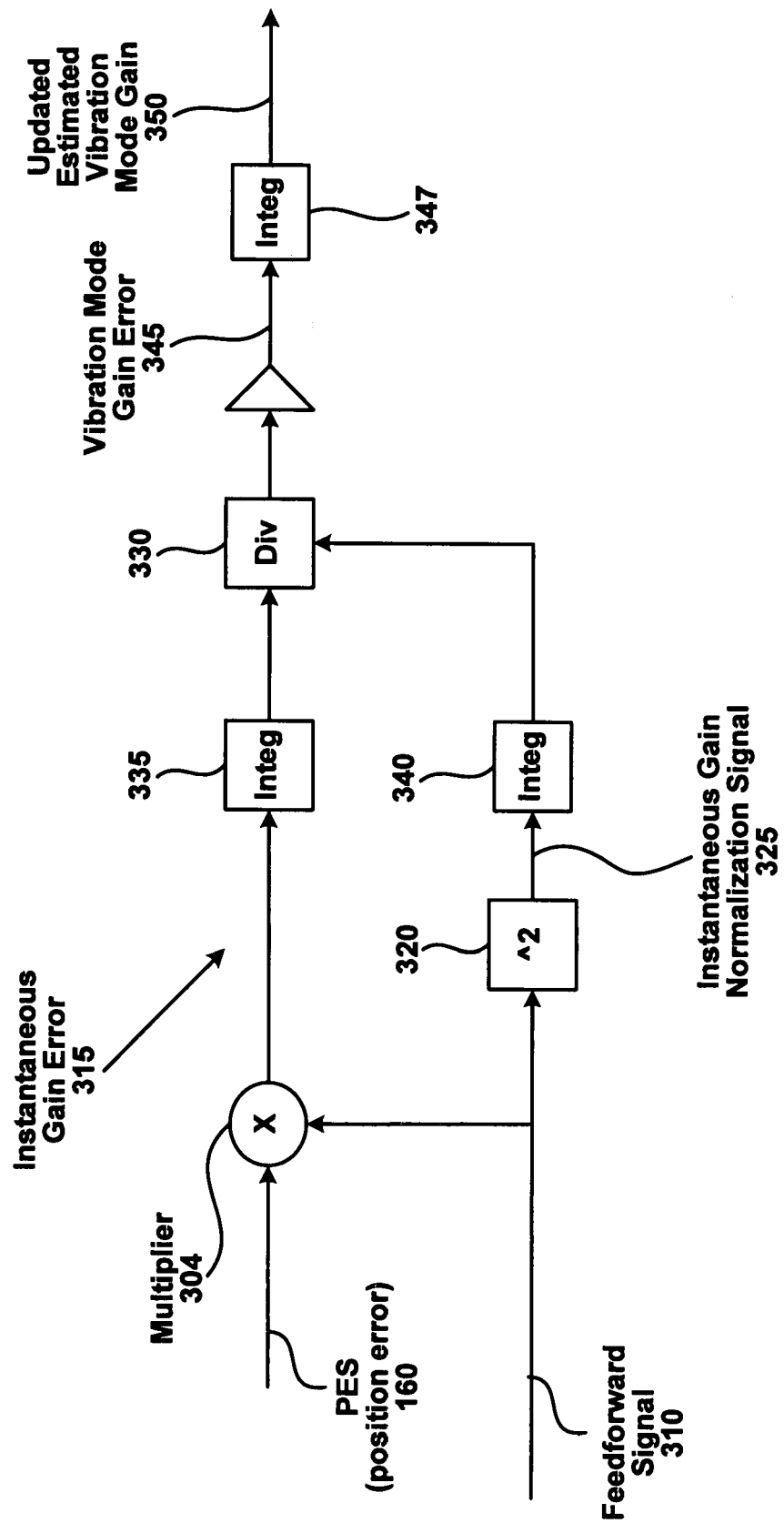
FIG. 3 is a block diagram showing the process performed to identify an updated estimated vibration mode gain in accordance with one embodiment of the present technology.

Referring to 505 of FIG. 5 and to FIGS. 1A, 1B, 2, and to FIG. 3, a block diagram showing the process performed in identifying an updated estimated vibration mode gain 350, in one embodiment feedforward filter 210 is adjusted. In one example of the present technology, adjusting feedforward filter 210 comprises identifying an updated estimated vibration mode gain 350 and applying updated estimated vibration mode gain 350 to feedforward filter 210, wherein feedforward filter 210 is located before actuator control signal 212.

In another example of the present technology, adjusting feedforward filter 210 comprises identifying an updated estimated vibration mode gain 350, applying updated estimated vibration mode gain 350 to feedforward filter 210, identifying an updated estimated vibration mode frequency 455, and applying updated estimated vibration mode frequency 455 to feedforward filter 210, wherein feedforward filter 210 is located before actuator control signal 212.

Identifying an Updated Estimated Vibration Mode Gain

Referring now to FIGS. 1A, 1B, 2B (a block diagram of an example feedforward filter adjustment module 205 in accordance with one embodiment), and to FIG. 3, in one embodiment, feedforward filter adjuster 208 comprises updated estimated vibration mode gain identifier 225, and updated estimated vibration mode gain applicator 230. Updated estimated vibration mode gain identifier 225 comprises instantaneous gain error calculator 235, instantaneous gain normalization signal calculator 240, and vibration mode gain error calculator 245.

In identifying an updated estimated vibration mode gain 350, a seek operation is performed. For example, initially, after the power of HDD 110 is turned on, the initial estimated vibration mode gain is zero and is held in integrator 347. Hence, the gain of feedforward filter 210 is also set to be zero, as well as the output of feedforward filter 210. While a seek is being performed for the first time, PES 160 experiences a vibration due to the characteristics of the soft mounting. Then the process described in FIG. 3 and sections herein identifies vibration mode gain error 345, and updates integrator 347 to render updated estimated vibration mode gain 350. Additionally, the gain of feedforward filter 210 is also updated. However, since this updated estimated vibration mode gain 350 may not reach the true vibration mode gain value of the soft mounting, another seek may be necessary.

When the next seek operation is performed, the vibration of PES 160 gets smaller because the gain of feedforward filter 210 is no longer zero, and feedforward filter output 415 compensates for PES 160 vibrations. Since the vibrations experienced by PES 160 become smaller, the resulting updated estimated vibration mode gain 350 is also smaller. Eventually, after a number of seek operations are performed, the updated estimated vibration mode gain becomes zero and converges with the true vibration mode gain value.

Instantaneous gain error calculator 235 is configured for multiplying position error signal 160 by a feedforward signal 310 in order to calculate instantaneous gain error 315. Instantaneous gain normalization signal calculator 240 is configured for squaring feedforward signal 310 in order to calculate instantaneous gain normalization signal 325, thereby detecting the magnitude. The magnitude is necessary to normalize instantaneous gain error 315, such that vibration mode gain error 345 does not become too large or too small.

Vibration mode gain error calculator 245 is configured for dividing 330 integrated 335 instantaneous gain error 315 by integrated 340 instantaneous gain normalization signal 325 to get vibration mode gain error 345. Instantaneous gain error 315 and instantaneous gain normalization signal 325 are integrated (a low pass filter is applied to each) in order to remove some existing high frequency noise. Vibration mode gain error 345 is applied to a previously updated estimated vibration mode gain 350 in order to achieve a most recently updated estimated vibration mode gain 350. This updated estimated vibration mode gain 350 is applied to the gain of feedforward filter 210 by updated estimated vibration mode gain applicator 230, adjusting feedforward filter 210.

Identifying an Updated Estimated Vibration Mode Frequency

Updated estimated vibration mode gain 350 is used to adjust the gain of feedforward filter 210. Without a feedforward signal, position error signal 160 will always indicate an existing vibration. However, when the correct cancellation signal described herein is applied, position error signal 160 does not indicate any existing vibrations. Even though position error signal 160 does not indicate any existing vibrations, and despite a correct cancellation signal, HDD 110 is still vibrating.

In order to identify the vibration being experience by the HDD 110, an updated estimated vibration mode frequency is identified and applied to feedforward filter 210 as is described in the following section.

Figure 4:
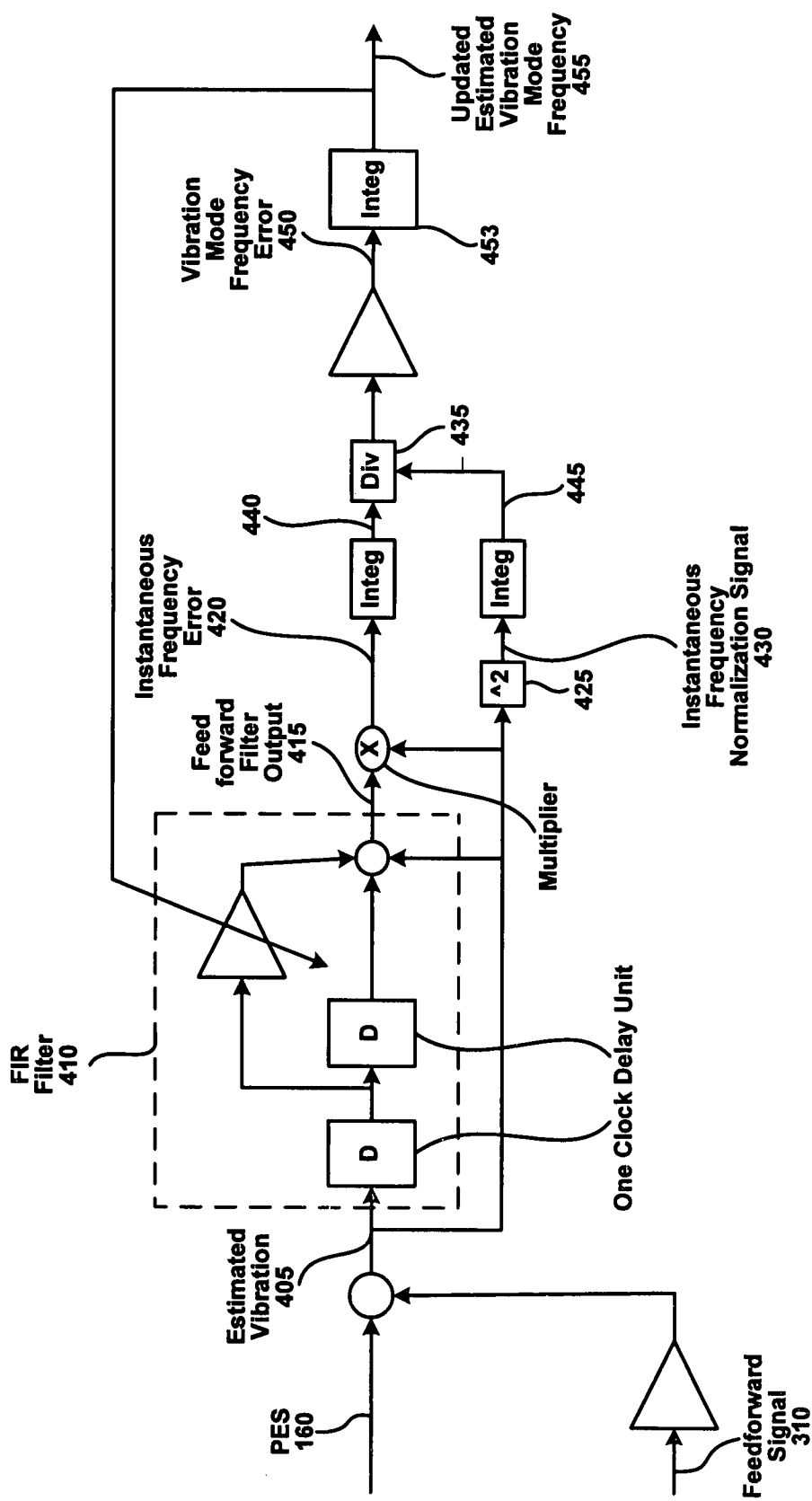
FIG. 4 is a block diagram showing the process performed to identify an updated estimated vibration mode frequency in accordance with one embodiment of the present technology.

Referring now to FIGS. 1A, 1B, 2B (a block diagram of an example feedforward filter adjustment module 205 in accordance with one embodiment), and to FIG. 4, in one embodiment, feedforward filter adjuster 208 also comprises updated estimated vibration mode frequency identifier 250 and updated estimated vibration mode frequency applicator 255, as well as updated estimated vibration mode gain identifier 225 and updated estimated vibration mode gain applicator 230. Updated estimated vibration mode frequency identifier 250 is configured for identifying an updated estimated vibration mode frequency. Updated estimated vibration mode frequency applicator 255 is configured for applying the updated estimated vibration mode frequency to feedforward filter 210, wherein feedforward filter 210 is located before an actuator control signal 212.

Referring now to FIG. 2B, and to FIG. 4, a block diagram showing the process performed in identifying an updated estimated vibration mode frequency 455, updated estimated vibration mode frequency identifier 250 comprises estimated vibration calculator 260, filter output calculator 265, instantaneous frequency error calculator 270, normalization signal calculator 275, and vibration mode frequency error calculator 280.

Estimated vibration calculator 260 is configured for subtracting feedforward signal 310 from position error signal 160 to calculate the estimated vibration 405 which is occurring in HDD 110. In order to identify the frequency of the estimated vibration 405 from position error signal 160 and feedforward signal 310, a finite impulse response (FIR) filter is used. For example, filter output calculator 265 is configured for feeding estimated vibration 405 through a finite impulse response (FIR) filter 410 to calculate filter output 415. When the frequency of the estimated vibration 405 changes, the phase of filter output 415 also changes. Additionally, clock delay units may be interposed between calculating estimated vibration 405 and calculating filter output 415.

In order to convert this phase difference into a signal amplitude, instantaneous frequency error calculator 270 is configured for multiplying filter output 415 by an FIR filter 410 input, which is estimated vibration 405 to get instantaneous frequency error 420. Normalization signal calculator 275 is configured for squaring 425 estimated vibration 405 to get instantaneous frequency normalization signal 430.

Next, instantaneous frequency error 420 and instantaneous frequency normalization signal 430 are applied to integrators used as a low pass filter. An integrated instantaneous frequency error 420 is divided at 435 by an integrated instantaneous frequency normalization signal 430 to get vibration mode frequency error 450. Vibration mode frequency error 450 is then used to update integrator 453 (integrator 453 holds a current estimated vibration mode frequency), and to update an FIR filter 410. The updated estimated vibration mode frequency 455 modifies the coefficient of the feedforward filter 210 to match the resonant frequency of the soft mounting.

The explanation herein regarding Identifying an Updated Estimated Vibration Mode Gain and the value of the updated estimated vibration mode gain is applicable to the value of the updated estimated vibration mode frequency 455. For example, once HDD 110 is powered on, the initial estimated vibration mode frequency is zero and is held in integrator 453. While a seek is being performed for the first time, PES 160 experiences a vibration due to the characteristics of the soft mounting. Then the process described in FIG. 4 and sections herein identifies the frequency error, and updates integrator 453 to render updated estimated vibration mode frequency 460. Additionally, FIR filter 410 coefficient is also updated. In one embodiment, this process described in FIG. 4 occurs concurrently with the process described in FIG. 3. In another embodiment, only identifying an updated estimated vibration mode gain 350 occurs (FIG. 3).

Generating a Cancellation Signal by a Feedforward Filter

Referring now to FIGS. 1A, 1B, 2A, 3, 4, and to 510 of FIG. 5, one embodiment of the present technology generates cancellation signal 211 utilizing an adjusted feedforward filter 210, wherein adjusted feedforward filter 210 models a resonance of a vibration mode. In one example of the present technology, the gain of an adjusted feedforward filter 210 models a resonance of updated estimated vibration mode gain 350. In another example of the present technology, the resonance of the adjusted feedforward filter 210 models a resonance of an updated estimated vibration mode frequency 455.

Providing a Cancellation Signal at an Actuator Control Signal

Referring now to FIGS. 1A, 1B, 2A, 3, 4, and to 515 of FIG. 5, one embodiment of the present technology provides cancellation signal 211 at actuator control signal 212, thereby inducing a force applied to actuator 207 such that the force holds actuator 207 at a track center position while vibrations occur during HDD 110 operations.

Referring now to FIG. 2, in one embodiment, FFAM 205 comprises adjusting feedforward filter 210, providing cancellation signal 211 by feedfoward filter 210, providing cancellation signal 211 at actuator control signal 212, as described herein, as well as initiating method 500 at a seek settling phase by cancellation signal initiator 285. Cancellation signal initiator 285 is configured for prompting feedforward filter adjuster 208 to adjust feedforward filter 210 at a seek settling phase of an HDD 110 operation.

In one implementation of the present technology, a method of adaptively adjusting feedforward filter 210 for reducing position error signal 160 comprises identifying updated estimated vibration mode gain 350, applying updated estimated vibration mode gain 350 to feedforward filter 210 to generate cancellation signal 211. Feedforward filter 210 is located before actuator control signal 212. Cancellation signal 211 is provided at actuator control signal 212, wherein cancellation signal 211 models a resonance of a vibration mode of soft mounting 206. Cancellation signal 211 has the effect of inducing a force to be applied to actuator 207 such that the force holds actuator 207 at a track center position, thereby reducing an effect of vibrations occurring during seek operations.

Thus, embodiments of the present invention provide an apparatus and method of reducing the effect of vibrations associated with seek operations. The apparatus and method described herein keeps the head maintained on the same track, thereby reducing and/or eliminating errors occurring due to shock and vibrations experienced by an HDD.

What is claimed is:

1. A method of reducing the effect of vibrations associated with seek operations, said method comprising:
   adjusting a feedforward filter;
   generating a cancellation signal utilizing an adjusted feedforward filter, wherein said adjusted feedforward filter models a resonance of a vibration mode; and
   providing said cancellation signal at an actuator control signal, thereby inducing a force applied to an actuator such that said force holds said actuator at a track center position while vibrations occur during hard disk drive operations.

2. The method of claim 1, wherein said adjusting a feedforward filter comprises:
   identifying an updated estimated vibration mode gain; and
   applying said updated estimated vibration mode gain to said feedforward filter, wherein said feedforward filter is located before an actuator control signal.

3. The method of claim 2, further comprising:
   identifying an updated estimated vibration mode frequency; and
   applying said updated estimated vibration mode frequency to said feedforward filter, wherein said feedforward filter is located before an actuator control signal.

4. The method of claim 3, wherein said identifying an updated estimated vibration mode frequency comprises:
   subtracting said feedforward signal from a position error signal to calculate an estimated vibration;
   feeding said estimated vibration through a finite impulse response (FIR) filter to calculate a filter output;
   multiplying said filter output by said estimated vibration to calculate an instantaneous frequency error;
   squaring said filter output to get an instantaneous frequency normalization signal;
   dividing an integrated said instantaneous frequency error by an integrated said instantaneous frequency normalization signal to get a vibration mode frequency error, said vibration mode frequency error used to update said estimated vibration mode frequency and to update an FIR filter coefficient.

5. The method of claim 2, wherein said identifying an updated estimated vibration mode gain comprises:
   multiplying a position error signal by a feedforward signal to calculate an instantaneous gain error;
   squaring said feedforward signal to calculate an instantaneous gain normalization signal; and
   dividing an integrated said instantaneous gain error by an integrated said gain normalization signal to get said vibration mode gain error, said vibration mode gain error used to update an estimated vibration mode gain.

6. The method of claim 1, further comprising:
   initiating said method at a seek settling phase.

7. The method of claim 1, further comprising:
   modeling a resonance of an updated estimated vibration mode gain by a gain of said adjusted feedforward filter.

8. The method of claim 7, further comprising:
   modeling a resonance of an updated estimated vibration mode frequency by a resonance of said adjusted feedforward filter.

9. A method of adaptively adjusting a feedforward filter for reducing a position error signal, said method comprising:
   identifying an updated estimated vibration mode gain;
   applying said updated estimated vibration mode gain to a feedforward filter to generate a cancellation signal, wherein said feedforward filter is located before an actuator control signal and a gain of said feedforward filter models a resonance of said updated estimated vibration mode gain; and
   providing said cancellation signal at said actuator control signal, said cancellation signal inducing a force applied to an actuator such that said force holds said actuator at a track center position, thereby reducing an effect of vibrations occurring during hard disk drive operations.

10. The method of claim 9, further comprising:
    identifying an updated estimated vibration mode frequency; and
    applying said updated estimated vibration mode frequency to said feedforward filter, thereby contributing to a generation of said cancellation signal, wherein a resonance of said feedforward filter models a resonance of said updated estimated vibration mode frequency, and wherein said feedforward filter is located before an actuator control signal.

11. The method of claim 10, wherein said identifying an updated estimated vibration mode frequency comprises:
    subtracting a feedforward signal from a position error signal to calculate an estimated vibration mode frequency;
    feeding said estimated vibration through a finite impulse response (FIR) filter to calculate a filter output;
    multiplying said filter output by said estimated vibration to calculate an instantaneous frequency error;
    squaring said filter output to get an instantaneous frequency normalization signal;
    dividing an integrated said instantaneous frequency error by an integrated said instantaneous frequency normalization signal to get a vibration mode frequency error, said vibration mode frequency error used to update an estimated vibration mode frequency and to update an FIR filter coefficient.

12. The method of claim 9, wherein said identifying an estimated vibration mode gain comprises:
    multiplying a position error signal by a feedforward signal to calculate an instantaneous gain error;
    squaring said feedforward signal to calculate an instantaneous gain normalization signal; and
    dividing an integrated said instantaneous gain error by an integrated said instantaneous gain normalization signal to get a vibration mode gain error, said vibration mode gain error used to update said estimated vibration mode gain.

13. The method of claim 9, further comprising:
    initiating said method at a seek settling phase.

14. A hard disk drive comprising:
    a housing;
    at least one disk mounted to the housing and rotatable relative to the housing;
    an actuator mounted to said housing and being movable relative to said at least one disk, said actuator having a suspension for reaching over said at least one disk, said suspension having a slider coupled therewith, said slider having a read/write head element; and a feedforward filter adjustment module configured for adjusting a feedforward filter to provide a cancellation signal at said actuator control signal, said cancellation signal inducing a force applied to an actuator such that said force holds said actuator at a track center position, thereby reducing an effect of vibrations occurring during hard disk drive operations.

15. The hard disk drive of claim 14, wherein said feedforward filter modification module comprises:
   a feedforward filter adjuster configured for adjusting a feedforward filter;
   a cancellation signal generator configured for generating a cancellation signal from an adjusted feedforward filter; and
   a cancellation signal provider configured for providing said cancellation signal at an actuator control signal.

16. The hard disk drive of claim 15, wherein said feedforward filter adjuster comprises:
   an updated estimated vibration mode gain identifier configured for identifying an updated estimated vibration mode gain; and
   an updated estimated vibration mode gain applicator configured for applying said updated estimated vibration mode gain to a feedforward filter, wherein said feedforward filter is located before an actuator control signal.

17. The hard disk drive of claim 16, further comprising:
   an updated estimated vibration mode frequency identifier configured for identifying an updated estimated vibration mode frequency; and
   an updated estimated vibration mode frequency applicator configured for applying said updated estimated vibration mode frequency to said feedforward filter, wherein said feedforward filter is located before an actuator control signal.

18. The hard disk drive of claim 17, wherein said updated estimated vibration mode frequency identifier comprises:
   an estimated vibration calculator configured for subtracting said feedforward signal from a position error signal to calculate an estimated vibration;
   a filter output calculator configured for feeding said estimated vibration through a finite impulse response (FIR) filter to calculate a filter output;
   an instantaneous frequency error calculator configured for multiplying said filter output by said estimated vibration to calculate an instantaneous frequency error;
   a normalization signal calculator configured for squaring said filter output to get an instantaneous frequency normalization signal; and
   a vibration mode frequency error calculator configured for dividing an integrated said instantaneous frequency error by an integrated said instantaneous frequency normalization signal to get a vibration mode frequency error, said vibration mode frequency error used to update said estimated vibration mode frequency and to update an FIR filter coefficient.

19. The hard disk drive of claim 16, wherein said updated estimated vibration mode gain identifier comprises:
   an instantaneous gain error calculator configured for multiplying a position error signal by said feedforward signal to calculate an instantaneous gain error;
   an instantaneous gain normalization signal calculator configured for squaring said feedforward signal to calculate an instantaneous gain normalization signal; and
   a vibration mode gain error calculator configured for dividing an integrated gain error by an integrated said instantaneous gain normalization signal to get a vibration mode gain error, said vibration mode gain error used to update said estimated vibration mode gain.

20. The hard disk drive of claim 14, further comprising:
   a cancellation signal initiator configured for prompting said feedforward filter adjuster to adjust said feedforward filter at a seek settling phase.

* * * * *